G. E. FOSS AND H. G. JENSEN.
DISK RECORD HOLDER.
APPLICATION FILED SEPT. 18, 1919.

1,349,272.

Patented Aug. 10, 1920.
2 SHEETS—SHEET 1.

INVENTORS
G. E. Foss
H. G. Jensen
BY
Munn & Co.
ATTORNEYS

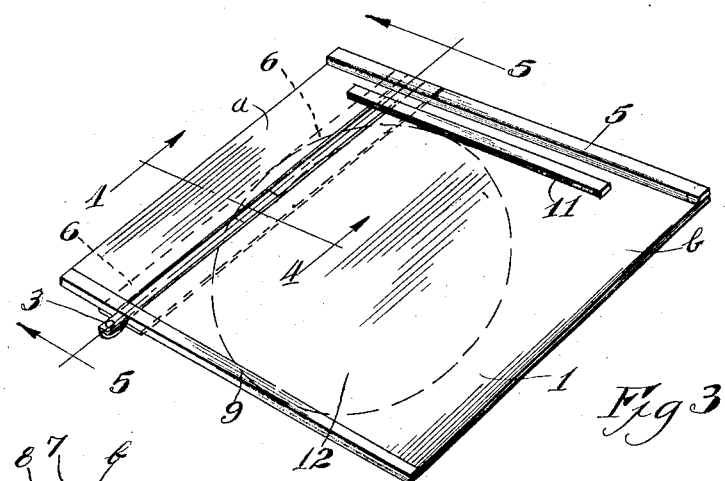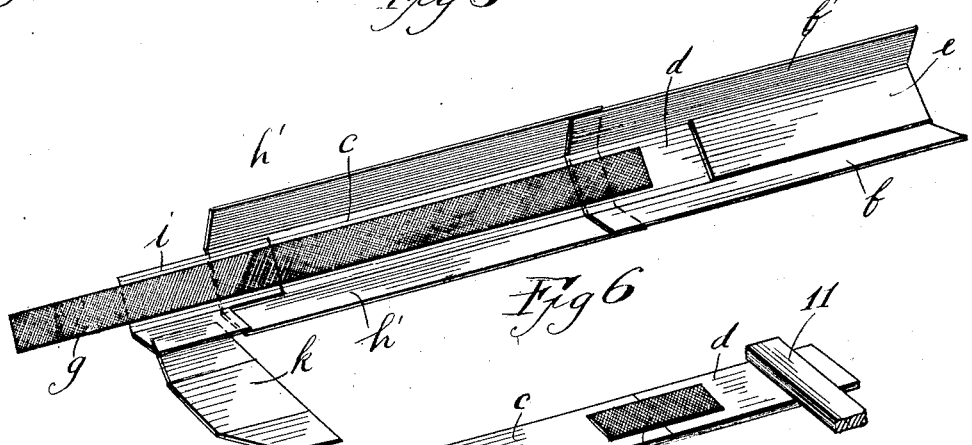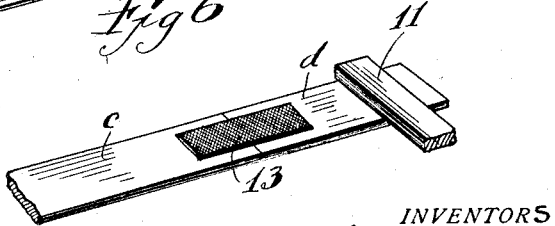

UNITED STATES PATENT OFFICE.

GUSTAV E. FOSS, OF CHICAGO, AND HARRY GAROLD JENSEN, OF BERWYN, ILLINOIS.

DISK-RECORD HOLDER.

1,349,272.

Specification of Letters Patent. Patented Aug. 10, 1920.

Application filed September 18, 1919. Serial No. 324,444.

*To all whom it may concern:*

Be it known that we, GUSTAV E. FOSS, a citizen of the United States, and a resident of the city of Chicago, in the county of Cook and State of Illinois, and HARRY G. JENSEN, a citizen of the United States, and a resident of Berwyn, in the county of Cook and State of Illinois, have invented a new and useful Improvement in Disk-Record Holders, of which the following is a full, clear, and exact description.

Our invention relates to improvements in record holders for disk phonograph records, and it consists in the combinations, constructions and arrangements herein described and claimed.

An object of our invention is to provide an inexpensive record holder in which the records may be held compactly, means being provided for identifying any record and for moving it forwardly, whereby the record may be easily withdrawn.

A further object of our invention is to provide a disk record holder which is adjustable so that records of various sizes may be held and brought into position to be withdrawn by a uniform movement of the withdrawing mechanism.

Other objects and advantages will appear in the following specification, and the novel features of the invention will be particularly pointed out in the appended claims.

Our invention is illustrated in the accompanying drawings, forming part of this application, in which—

Fig. 3 is a perspective view of one of the supporting shelves or leaves,

Fig. 4 is a section along the line 4—4 of Fig. 3,

Fig. 5 is a section along the line 5—5 of Fig. 3,

Fig. 6 is a perspective view showing the construction of the operating means for withdrawing the disks, and Fig. 7 is a perspective view showing a modified means for joining portions of the drawing strip in their adjusted positions.

Figure 2:
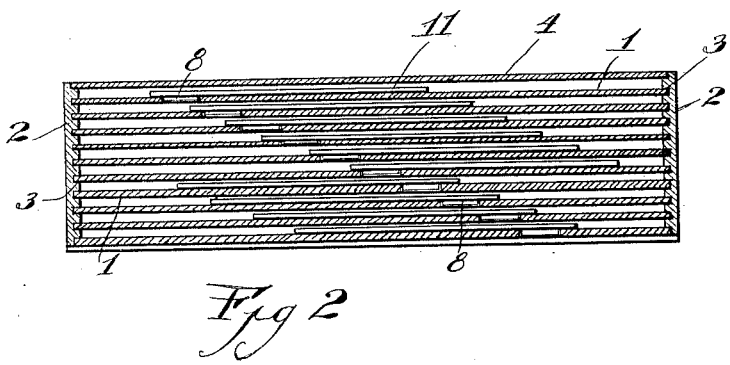
Fig. 2 is a transverse sectional view.

In carrying out our invention, we provide a series of shelves or leaves like that shown at 1 in Fig. 3. These shelves are preferably made of pasteboard or cardboard, and are arranged one above the other in the manner shown in Fig. 2. Any suitable means may be used for spacing the shelves apart. In the drawings, we have shown side members 2 which may be of wood or other suitable material, and which are provided with grooves 3 arranged to receive the ends of the shelves, thereby holding the latter in spaced relation. A top 4 of pasteboard is provided for covering the record on the uppermost shelf.

Referring now to Fig. 3, it will be seen that each shelf is provided with a spacing bar 5 at its rear end which is of substantially the same width as the distance between the grooves 3 of the side members 2. Each shelf consists of two portions $a$ and $b$, as clearly shown in Fig. 4, which are joined together on the bottom by a joining strip 6 of fabric or other suitable material, preferably pasted or glued in position. This provides a runway 7 for a flexible drawing strip 8. The forward upper edge of each shelf is provided with a joining strip 9 of passe partout, each joining strip being cut opposite the runway 7 to permit the passage of the flexible drawing strip 8 back and forth in drawing a record into position and in replacing it.

The flexible strips 8 are made preferably in the manner shown in Fig. 6. In this figure, it will be observed that there are two parts $c$ and $d$ to the strip which are connected together. The rear end of the strip $d$ has a reinforcing member $e$ of stiff cardboard, and is provided with flaps $f$ and $f'$. A piece of tape $g$ is fastened to the body portion of the strip $d$. The portion $c$ also has side flaps $h$ and $h'$, and to the forward end of the portion $c$ is pasted or glued an extension $i$ having secured thereto a strip of fabric or leather $k$. The portion $d$ has its flaps $f$ and $f'$ brought together and cemented or glued, while the portion $c$, which is exterior of the portion $d$, has its flaps brought together and cemented so that the portion $d$ is designed to slide within the portion $c$. The leather or fabric extension $k$ is folded around the tape $g$ to form a tab like those shown at 10 in Figs. 1 and 3. The end of the tape $g$ is then bent upwardly and rearwardly and tucked into the open end of the folded portion $k$, as shown in Fig. 5. The flexible drawing member thus formed is provided at its rear end with a cleat or cross strip 11 made of wood or other suitable material which is glued or otherwise secured to the rear portion $d$ of the flexible strip. In order to guide the flexible drawing strip 8 in its movement, we provide a guide strip m which is fastened at its rear end underneath the spacing member 5, and which extends to the forward edge of the shelf. This guide strip is disposed in the groove 7 and the front end, which is loose, is slipped into the telescopic sections of the drawing strip 8, so that the drawing strip slides back and forth in the groove, being guided by the strip m which forms a central core for the hollow drawing strip 8.

From the foregoing description of the various parts of the device, the operation thereof may be readily understood.

Figure 1:
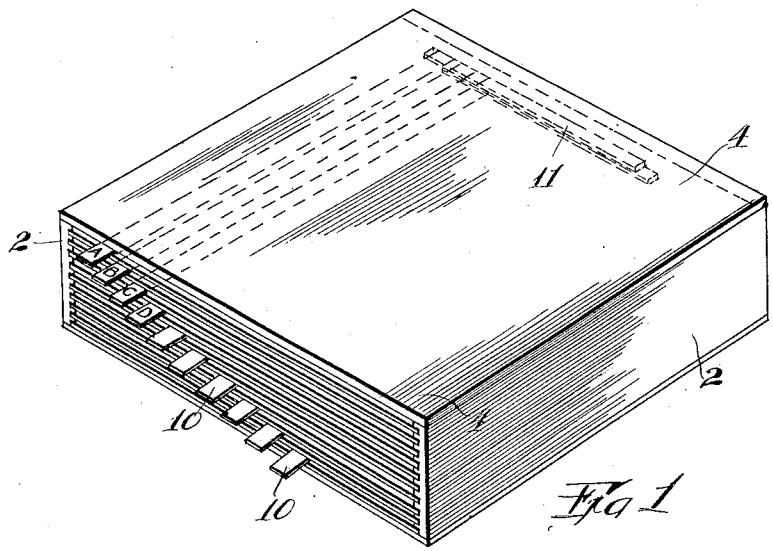
Figure 1 is a perspective view of the record holder.

Normally, the parts are in the position shown in Fig. 1 with the tabs projecting. These tabs may be numbered or lettered to indicate the particular record which its corresponding shelf carries. The records 12 are carried on the shelves in the manner shown in Fig. 3, their rear edges engaging the cleat or cross strip 11. Now, by pulling forwardly on the tab corresponding to the record desired, the record will be forced by the cross strip outwardly, where it may be grasped by the hand and removed from the case. After it is played and it is desired to replace it, the shelf from which it was removed may be instantly located, because the tab which was used in pulling the record forwardly is out, i. e., in advance of the other tabs. The record is replaced on the shelf and pushed inwardly, thereby carrying the tab with it and returning the tab to its normal position. If it is desired to adjust the position of the cleat 11 to accommodate a particular size record, it may be done by pulling out the end of the tape g and then moving the cleat forwardly by pulling on the tape g, thereby causing the portion d (see Fig. 6) to move into the portion c, carrying the cleat with it until the cleat is in a position to engage the inner end of a record, when the latter is inserted on the shelf. The extending portion of the tape g is then tucked in, as shown in Fig. 5. If it should be desired to insert a larger record, the latter is placed on the shelf and pushed in as far as it will go, and then the extended end of the tape g is tucked in as described. Where it is desired to dispense with the tape g, then the two portions c and d may be adjusted manually, and the portions fastened in their adjusted positions by means of a strip of tape which is glued or otherwise cemented across the joint of the sections, as shown at 13 in Fig. 7.

We claim:

1. A disk record holder comprising a plurality of shelves spaced apart, each shelf having a groove extending from rear to front, a flexible drawing strip disposed in each groove, and a transversely disposed cleat or arm secured to said drawing strip.

2. A disk record holder comprising a plurality of shelves spaced apart, each shelf having a groove extending from rear to front, a flexible drawing strip disposed in each groove, a transversely disposed cleat or arm secured to said drawing strip, and an identification tab carried by the drawing strip at the front end thereof.

3. In a disk record holder, a plurality of shelves spaced apart, each shelf being provided with a groove, the grooves of adjacent shelves being out of registration, a flexible drawing strip disposed in each groove, a transverse cleat or arm secured to each drawing strip and arranged to slide on its associated shelf, and an indicating tab secured to the forward end of each of said drawing strips and arranged to project outwardly from the front edge of its associated shelf.

4. In a disk record holder, a plurality of shelves, each of said shelves having a groove extending from the rear to the front on the upper face of the shelf, a flexible drawing strip comprising a pair of telescopic members, means for adjustably securing said telescopic members together, and a transverse cleat or arm secured to one of said telescopic members.

5. A disk record holder comprising a plurality of shelves spaced apart at equal distances, each of said shelves being provided with a groove running from the rear to the front, said grooves being parallel and being offset progressively from the top shelf to the bottom shelf, a flexible drawing member disposed in each groove, and a transversely disposed cleat or arm secured to each of said flexible drawing strips.

6. In a disk record holder, a shelf provided with a groove extending from the front to the rear, a flexible drawing strip disposed within said groove, said drawing strip comprising a pair of adjustable sections, means for adjustably securing one of said sections to the other, and a transversely disposed cleat or arm secured to the rear section.

7. A disk record holder comprising a shelf having a groove extending from front to rear, a flexible drawing strip disposed within said groove, said drawing strip comprising a pair of hollow telescopic members, and a transverse cleat or arm secured to one of said telescopic members and arranged to slide on the shelf.

8. A disk record holder comprising a shelf having a groove extending from front to rear, a flexible drawing strip disposed within said groove, said drawing strip comprising a pair of hollow telescopic members, a transverse cleat or arm secured to one of said telescopic members and arranged to slide on the shelf, and means for adjustably securing said telescopic members together.

9. A disk record holder comprising a shelf having a groove extending from front to rear, a flexible drawing strip disposed within said groove, said drawing strip comprising a pair of hollow telescopic members, a transverse cleat or arm secured to one of said telescopic members and arranged to slide on the shelf, means for adjustably securing said telescopic members together, and a guide strip secured at one end to said shelf and extending through said telescopic members.

10. A disk record holder comprising a shelf having a groove extending from front to rear, a flexible drawing strip disposed within said groove, said drawing strip comprising a pair of hollow telescopic members, a transverse cleat or arm secured to one of said telescopic members and arranged to slide on the shelf, means for adjustably securing said telescopic members together, a guide strip secured at one end to said shelf and extending through said telescopic members, and an identification tab secured to said flexible strip and arranged to project outwardly from the forward edge of the shelf in the normal position of the cleat.

GUSTAV E. FOSS.
HARRY GAROLD JENSEN.